United States Patent [19]

Nagano et al.

[11] Patent Number: 5,012,264

[45] Date of Patent: Apr. 30, 1991

[54] COUPLING DEVICE AND POWER DEVICE FOR SUPPLYING ELECTRICAL POWER AS THE COUPLING IS ESTABLISHED

[75] Inventors: Masatoshi Nagano; Kenichi Kawamoto, both of Tokyo, Japan

[73] Assignee: Canon Kabushiki Kaisha, Tokyo, Japan

[21] Appl. No.: 471,698

[22] Filed: Jan. 26, 1990

Related U.S. Application Data

[60] Continuation of Ser. No. 234,513, Aug. 22, 1988, abandoned, which is a division of Ser. No. 175,591, Mar. 28, 1988, abandoned, which is a continuation of Ser. No. 51,042, May 15, 1987, abandoned.

[30] Foreign Application Priority Data

May 16, 1986 [JP] Japan .................. 61-110849
May 21, 1986 [JP] Japan .................. 61-076741

[51] Int. Cl.$^5$ .............................. G03B 17/12
[52] U.S. Cl. .................................... 354/286
[58] Field of Search ................. 350/252; 354/286

[56] References Cited

U.S. PATENT DOCUMENTS

| | | | |
|---|---|---|---|
| 2,756,633 | 7/1956 | Brandes et al. | 354/286 |
| 3,620,149 | 11/1971 | Ogihara | 354/286 |
| 3,906,534 | 9/1975 | Shirasaki | 354/286 |
| 4,003,068 | 1/1977 | Hashimoto et al. | 354/286 |
| 4,017,878 | 4/1977 | Hagihara | 354/286 |
| 4,464,034 | 8/1984 | Toraino | 354/286 |
| 4,529,288 | 7/1985 | Nalsai et al. | 354/442 |
| 4,564,265 | 1/1986 | Miki | 354/286 X |
| 4,660,953 | 4/1987 | Fuchi et al. | 354/286 |
| 4,748,467 | 5/1988 | Maekawa et al. | 354/286 |
| 4,766,453 | 8/1988 | Shiokama et al. | 354/286 |

Primary Examiner—Michael L. Gellner
Attorney, Agent, or Firm—Robin, Blecker, Daley & Driscoll

[57] ABSTRACT

An electrical power source connecting device for connecting a first functional body having an electrical power source and a second functional body by an releasably attached connecting portion having an electrical connecting portion is disclosed, comprising a switch whose state is changed when the attaching of the first and second functional bodies is completed, and control means for discriminating the state of the switch upon affirmation of the attachment of the first and second functional bodies to supply electrical power from the electrical power source to the second functional body through the electrical connecting portion, the aforesaid connecting portion including a manually operable locking member for maintaining the attached state and for releasing the attached state, and the aforesaid switch cooperating with the locking member in such a manner that when the attaching of the first and second functional bodies is complete, its state changes, and when the locking member is operated to release, its state changes to stop the electrical power supply before the movement of the first and second bodies from the locking state starts.

25 Claims, 5 Drawing Sheets

COUPLING DEVICE AND POWER DEVICE FOR SUPPLYING ELECTRICAL POWER AS THE COUPLING IS ESTABLISHED

This application is a division of application Ser. No. 175,591, filed Mar. 28, 1988, which is a continuation of Ser. No. 51,042, filed May 15, 1987 both now abandoned, which is a continuation of application Ser. No. 234,513, filed Aug. 22, 1988, now abandoned.

BACKGROUND OF THE INVENTION

1. Field of the Invention

This invention relates to a coupling device and a power device responsive to establishment of the coupling for supplying electrical power, and more particularly to such devices of the sort suited to cameras.

2. Description of the Related Art

Of the conventional devices for connecting and disconnecting an electrical power source to and from a circuit, there is what is employed in, for example, the interchangeable lens type of cameras. The camera of this type comprises a body having the electrical power source or battery and, for example, a first microcomputer incorporated therein, and a lens unit releasably attached to the body and having incorporated therein a second microcomputer and electric motors for driving the diaphragm and the focusing lens, wherein it is the common practice that an interconnection terminal as the outlet of the battery and another interconnection terminal which is on the lens unit are arranged upon attachment of the lens unit to the body to be brought into direct contact with each other to establish a power line.

In such a conventional camera, however because as will be understood from above the power supply is started just when the two interconnection terminals come to contact with each other even if the lens unit is in detachment from the body, a battery voltage is always left to appear at the interconnection terminal on the body. Hence, it has been very likely that the voltage is accidentally applied to an adjacent interconnection terminal of a signal line. If so, it can destroy the first microcomputer. This has contributed to a defect of the reliability of the camera.

An attempt has been made to eliminate such a problem by disposing the faces of the terminals of the power and signal lines out of a common circle with its center at the optical axis either axially or radially so that the terminals on the lens unit are permitted to contact only with the corresponding ones on the body thereby the signal line is prevented from shorting out.

However, the use of this structure calls for a large increase of the space the interconnection terminal assembly occupies. Within the limited space, therefore, only a few terminals can be placed. If the number of terminals is increased to a desired value, the size of the camera would be caused to increase. Also, if the camera body without the lens unit is let stand alone, because the faces of the terminals are all exposed to the air and the power line is always supplied with the current from the battery, there is some possibility of occurrence of a shorting out of the signal line if it happens that a metal piece bridges over them. For such reasons, the above-described problem has not basically been overcome.

A technique for insuring the safety in the supply of electrical power by means of preventing the shorting out between the camera body and the lens unit has been proposed in U.S. Pat. application Ser. No. 877,264 filed June 23, 1986 and assigned to the assignee of the present invention where the terminal end of coupling of the lens unit with the camera body is detected by a mechanical switch, and, in that state, the microcomputers in the lens unit and body respectively are then allowed to communicate with each other in a prescribed scheme. Only after that, the battery voltage starts to appear at the power line to the motor.

The conventional coupling devices, among others, those suited particularly to the interchangeable lens type cameras have been known in many forms. Of these, the typical one which is leading the recent fashion in the field of art is illustrated in FIG. 7. The camera body 1 and the lens unit 2 have respective coupling members or mounts 3 and 16. A lock pin 12 is arranged in the camera body to enter a detect hole 13 provided in the lens unit under the action of a bias spring 14 when the coupling of the lens unit 2 with the camera body 1 is complete, thereby the lens unit 2 is hindered from rotating relative to the camera body 1. Thus, the coupling device is locked. To detach the lens unit 2 from the camera body, the camera user needs first to push down an operating member until the lock pin 12 retracts from the hole 13, and then to turn the lens unit 2 to a prescribed angular position where the coupling members 3 and 16 disengage from each other.

Here, during the attaching and detaching of the lens unit 2 to and from the camera body 1, the lock pin 12 slides not only at its end face on the lens side mount 16, but also at its peripheral surface on the wall of the hole 13 when the locking and unlocking take place. Therefore, as the number of times the interchanging of the lens unit 2 is repeated increases, the lock pin 12 and the lens side mount 16 are worn out, giving rise to a problem in that the accuracy of adjustment of the locked angular position of the lens unit 2 relative to the camera body is so largely decreased and the axial looseness between the mounts 3 and 16 is so largely increased as not to assure the correct alignment and the intimate contact of the electrical interconnection terminals on the camera body 1 and the lens unit 2 with each other when in the coupled position. Besides this, because it is only by the lock pin 12 that the lens unit 2 is held on the camera body 1 in the direction of rotation, if, as the lens unit 2 is turned to tighten relative to the camera body 1, a strong force is applied to it, the locking means 12 and 13 is deformed or broken with a high possibility.

SUMMARY OF THE INVENTION

A first object of the present invention is to eliminate partly or entirely the above-described problems of the prior art.

Another object of the invention is to provide a device for releasably interconnecting an electrical power line which is of simple structure while still permitting a great increase in the reliability of avoiding the shorting of any signal line when in connecting or disconnecting to be achieved, and an electrical power source device.

Under such an object, according to a preferred embodiment of the invention applied to the system comprising a first functional body having an electrical power source and a second functional body, both of which bodies are releasably attached to each other through respective coupling means, a device for releasably interconnecting the first and second functional bodies at their electrical terminals of a power line is proposed, comprising a switch arranged to change its position when the coupling of the first and second bodies is complete, control means for discriminating the position of the switch on affirmation of closed contact of the electrical terminals of the first and second bodies to start supply of an electrical power from the electrical power source to the second body through the power line, and a manually operable lock member for maintaining or releasing the two coupling means in or from engagement with each other, the switch and the lock member cooperating in such a manner that when the lock member is actuated to release the coupling means from the locking connection, the switch moves from the aforesaid position to a position where the supply of the electrical power stops, before the electrical terminals are taken out of contact with each other.

Still another object of the invention is to provide a device for removably coupling a camera body and an interchangeable lens with each other which enables the locked position to be adjusted with high accuracy and reliability, and which can maintain the accuracy and reliability stable against aging.

Under such an object, in application to the bayonet type coupling device for use in between the camera body and the interchangeable lens, an object of the present invention is to provide a locking mechanism in which a lock pin for hindering the bayonet mounts of the camera body and the lens from rotation relative to each other is made free from deformation, and the wearing out of the mount surface is prevented from giving a bad influence to the electrical interconnection.

Under such an object, according to a preferred embodiment of the present invention applied to the coupling device having a bayonet mount on the camera body and another bayonet mount on an accessory, the locking mechanism comprises a lock pin position on either one of the camera body and the accessory and a detent hole for the lock pin in the other, wherein that part of the lock pin which engages the detent hole when the coupling is locked is made different in position from that part of the lock pin which slides on the surface of one of the bayonet mounts.

Other objects and features of the invention will become apparent from the following description of an embodiment thereof taken in conjunction with the drawings.

DETAILED DESCRIPTION OF THE PREFERRED EMBODIMENT

Figure 7:
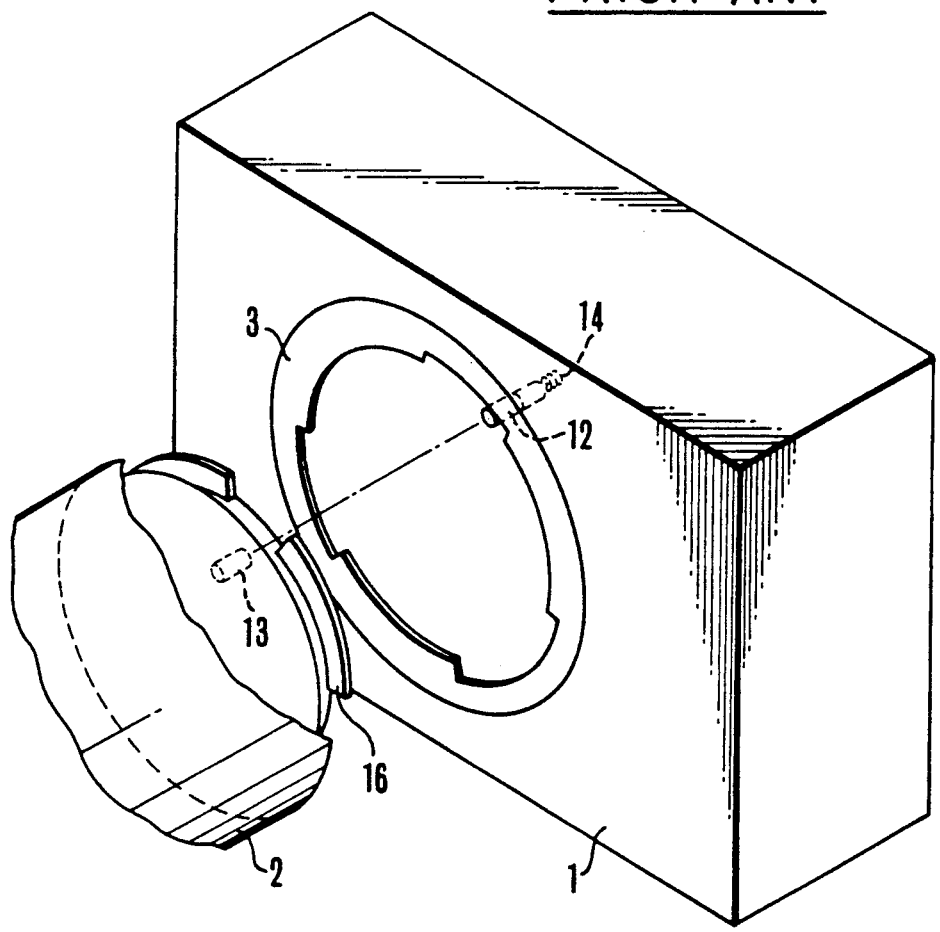
FIG. 7 illustrates the prior art.

An embodiment of the invention is next described as applied to the similar or interchangeable lens type camera to that described in connection with the prior art shown in FIG. 7.

Figure 1:
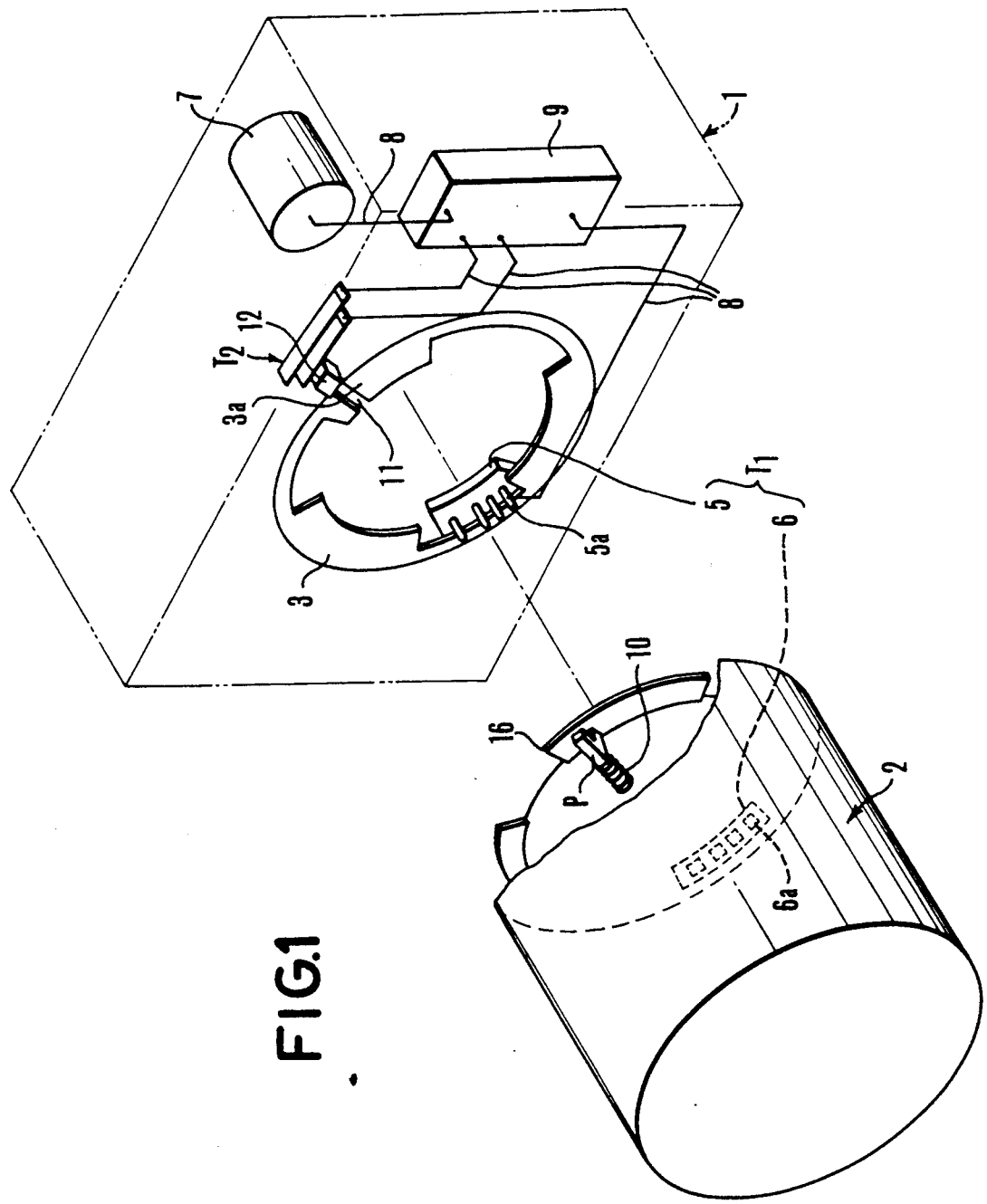
FIG. 1 is a perspective view of an embodiment of the invention applied to a camera.

In FIG. 1, 1 is a camera body (first functional body); 2 is a lens unit (second functional body, accessory) attachable to and detachable from this camera body 1; 3 is a mount on the camera body 1; 16 is a mount on the lens unit 2; 5 are electrical terminals as an electrical interconnection portion on the camera body 1; 6 are again electrical terminals as an electrical interconnection portion on the lens unit 2; $T_1$ are electrical contacts comprised of both of these terminals 5 and 6. Of the electrical terminals 5 and 6, the ones 5a and 6a are electrical power interconnection portions, the former being the power output terminal, and the latter being the power input terminal. The electrical contacts $T_1$ are electrically connected to each other when the lens unit 2 attached to the camera body at their mounts 16 and 3 is turned relative to the latter to effect tight coupling; P is a lock pin as the lock member for fixing the lens unit 2 on the camera body 1 in the coupling-completed position; $T_2$ is a switch which, in the coupled state, is opened and closed as it is driven by this lock pin P. For note, in FIG. 1, the neighborhood of the lock pin P is partly omitted for the purpose of better understanding. 7 is an electrical power source or battery incorporated within the camera body 1; 8 are power lines for supplying an electrical power to the electrical power output terminal 5a; 9 is control means provided between the switch $T_2$ and the electrical power output terminal 5a. When the switch $T_2$ is closed, as the coupling of the lens unit 2 to the camera body 1 is complete, the supply of the electrical power from the battery 7 to the electrical power output terminal 5a is controlled by the control means 9.

Figure 2:
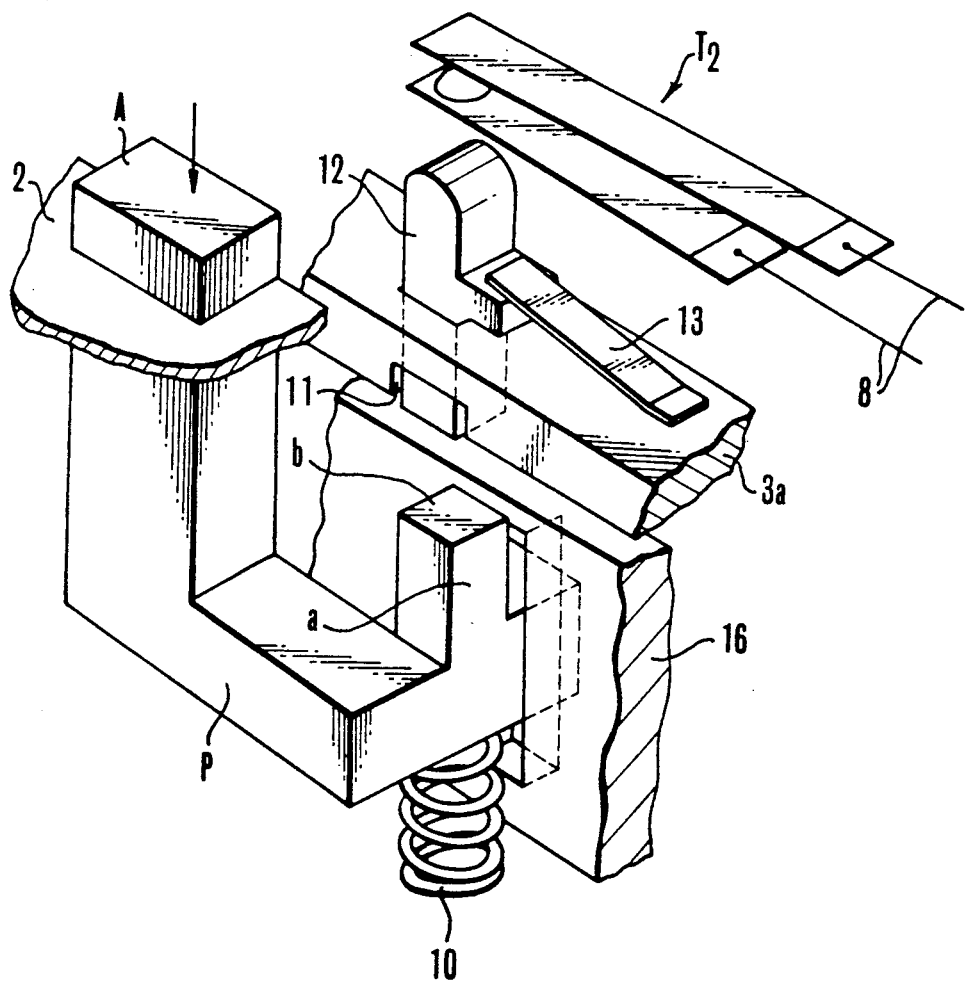
FIG. 2 is a perspective view in exaggerated scale of the main parts of FIG. 1.

Next, the form of the lock pin P and the switch $T_2$ is explained in detail by using FIG. 2 also. FIG. 2 illustrates a position in which the lock pin P is pushed in to a direction indicated by an arrow. The lock pin P is, as shown in FIG. 2, urged by a spring 10 to project outwardly of the lens unit 2, and is constructed with a fixing pin surface "a" fitted in a groove 11 provided in the mount 3 of the camera body 1 to fix the lens unit 2 in the coupling-completed position and a driving pin surface "b" for pushing an actuating member 12 movably fitted in a flange 3a of the mount 3 against the bias force of a compressing spring 13 therefor to thereby close the switch $T_2$. The switch $T_2$ is set in a normally open state, and is arranged to be closed by the actuating member 12 pushed by the lock pin P.

Also, the lock pin P has an operating portion A connected to thereto and projecting outwardly of an outer decorative portion of the lens unit 2. When the operating portion A is pushed in, the driving pin surface b of the lock pin P is moved downward so that the actuating member 12 is pushed down by the spring 13 thereby the switch $T_2$ can be opened.

Figure 3:
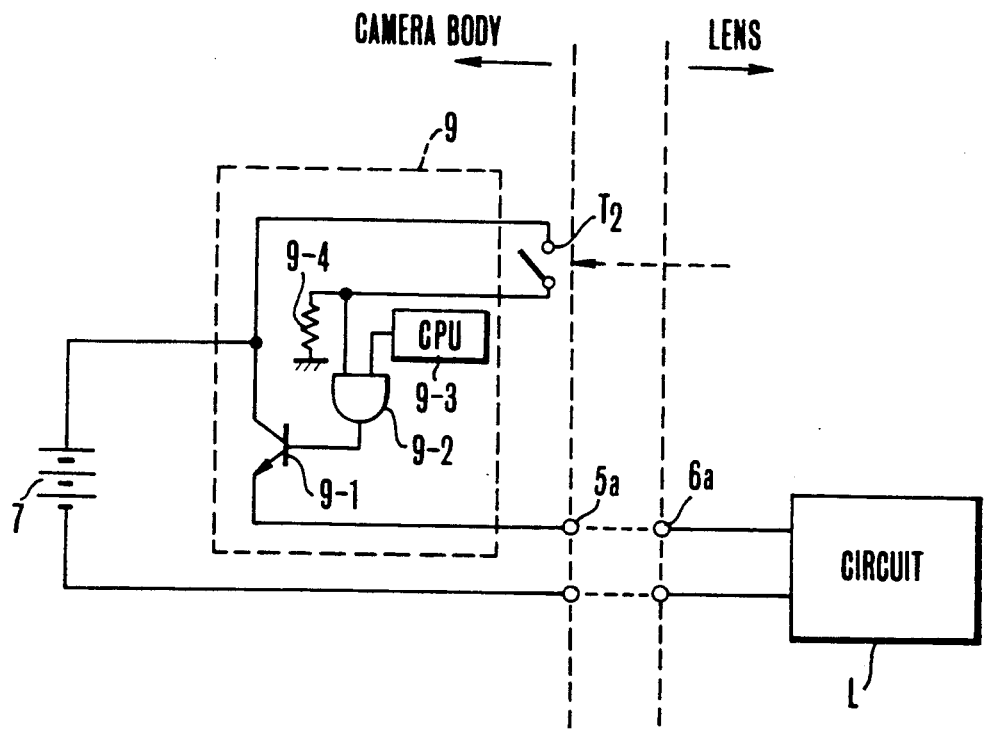
FIG. 3 is a block diagram of the electrical circuitry of the embodiment of FIG. 1.

FIG. 3 is a block diagram illustrating the electrical structure of the camera shown in FIGS. 1 and 2.

The control means 9 comprises a transistor 9-1 for controlling the electrical power supply, an AND gate 9-2 for producing an output signal for controlling the on and off states of the transistor 9-1, a microcomputer 9-3 (CPU) for generating a signal for controlling the electrical power supply, a pull-down resistor 9-4 for inputting "0" to one of the input terminals of the gate 9-2 when the switch $T_2$ is in the open state.

Now assuming that, as the coupling of the lens unit 2 is not complete yet, the switch $T_2$ is not turned on, then one of the two input terminals of the AND gate 9-2 receives "0", and its output is "0". Therefore, the transistor 9-1 is also off so that no voltage appears at the electrical power output terminal 5a. As the coupling of the lens unit 2 is completed, when the switch $T_2$ turns on as described in connection with FIGS. 1 and 2, a signal of "1" from the resistor 9-4 enters the AND gate 9-2 at one input thereof. If the output of the CPU 9-3 is "1", the gate 9-2 then changes its output to "1", thereby the transistor 9-1 is turned on. Hence, the electrical power starts to be supplied to the lens unit 2 through the terminals 5a and 6a which have already been placed in contact with each other.

For note, if, as, for example, a release switch of the camera body 1 is not turned on despite the coupling of the lens unit 2 is complete, the output of the CPU 9-3 changes to "0", thereby the transistor 9-1 is turned off to cut off the electrical power supply to a circuit L of the lens unit 2.

The operation is described below.

The lens unit 2 is first inserted into the camera body 1 by placing their mounts 16 and 3 in registry. After that, the lens unit 2 is turned about its optical axis relative to the camera body 1 until the coupling-completed position is just reached. In this position, the electrical contact $T_2$, that is, the electrical terminals 5 on the camera body 1 are connected to the electrical terminals 6 on the lens unit 2 Meanwhile, at almost the same time, the switch $T_2$ is closed. That is, at the same time when the lock pin P is inserted at its fixing pin face "a" into the insertion groove 11 of the mount 3 of the camera body 1, the lock pin P pushes the actuating member 12 out at its driving pin face "b" to close the switch $T_2$. When the fixing pin face "a" of the lock pin P has been inserted into the insertion groove 11 in engagement with the actuating member 12, the lens unit 2 is fixed to the camera body 1

When the switch $T_2$ closes the control means 9 discriminates such a state and renders the electrical power line 8 conducting over the entire length from the electrical power source 7 in the camera body 1 to the electrical contact $T_1$. Hence, the electrical power supply to the lens unit 2 becomes possible.

To detach the lens unit 2, the operating member A is operated to take the lock pin P out of the insertion groove 11, thereby the lens unit 2 is released from the locking connection. After that, the lens unit 2 is turned in the reverse direction to that when in coupling until the prescribed position is reached. For note, the aforesaid supply of electrical power is cut off at a point in time when the lock pin P has exited the insertion groove 11 to open the switch $T_2$. Therefore, before the start of a sliding movement of the contact surfaces of the camera body 1 and the lens unit 2, the supply of electrical power has already cut off. This produces an advantage in that the assurance of avoidance of an accident can be very improved.

As has been described above, in this embodiment, it is only when the lens unit 2 has been coupled with the camera body 1 to turn on the switch $T_2$ that the current supply from the camera body 1 to the lens unit 2 can be established. Therefore, when the lens unit 2 is not connected with the camera body 1, the electrical power output terminal 5a of the electrical contact $T_1$ on the camera body 1 is not in the energized state. Therefore, even if something wrong happens to touch an iron piece across the electrical power output terminal 5a and any other terminal, there is no possibility of occurrence of a shorting in the signal line. This can never constitute a cause of destroying the built-in microcomputer. Hence, a camera of high reliance can be obtained.

Also, since, in the electrical power supply line of the above-described embodiment, the electrical power is supplied through the control means 9, when in application of the invention to a case where a high electrical power must be supplied, a system of very high reliance is formed Also, the electrical power supply means may otherwise control the above-described supply of electrical power by another control information, for example, the on-off of the power switch of the camera body. Therefore, as compared with the method of supplying the electrical power directly by the mechanical switch whose switched position is changed when the coupling of the lens unit is complete, it has an advantage of saving electrical energy. That is, when unnecessary as the camera is out of use, the above-described supply of electrical power is stopped, thereby the wasteful consumption of electrical energy is reduced.

The switch $T_2$ in the above-described embodiment should be located in the camera body 1, but the lock pin P for actuating that switch $T_2$ and the insertion groove 11 may, conversely of the above-described embodiment, be arranged, that is, the lock pin P in the camera body 1 and the insertion groove 11 in the lens unit 2. Even in this case, an equivalent result to that of the embodiment can be effected. Also, though, in the above-described embodiment, the switch $T_2$ is of the mechanical form, another form such as that derived from the application of a magnetic sensor may be employed. For note, in the above-described embodiment, the combination of the camera body and the lens unit has been considered. But, it is to be understood that the present invention is applicable to other instruments.

Figure 4:
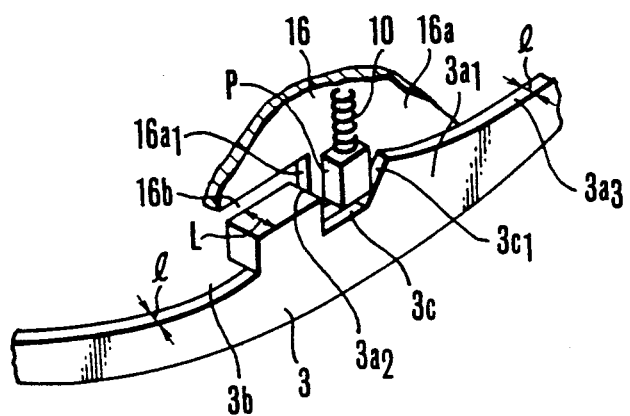
FIGS. 4 and 5 explain the coupling and decoupling operations.
Figure 5:
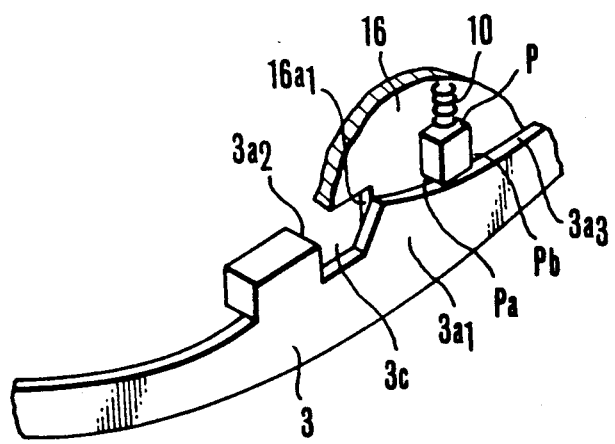

As has been described above, according to this embodiment, an electrical power source interconnecting device are provided and an electrical power source device which do not have any fear of shorting the signal line, and, therefore, destroying the incorporated microcomputer or the like, and give a high reliance Next, another embodiment of the bayonet mount coupling device shown in FIG. 1 is described in detail by using FIGS. 4 and 5.

FIGS. 4 and 5 are schematic views illustrating the construction of the coupling portions of the camera body and the interchangeable lens. For note, differing from FIG. 2, the vertical orientation is reversed in FIGS. 4 and 5. Also, in FIGS. 4 and 5, the push groove 11 and the actuating member 12 described in connection with FIG. 2 are omitted. However, it is of course possible to provide such a groove and an actuating member in the device of FIGS. 4 and 5.

In the drawings, 3 denotes a camera side bayonet mount member mounted on the camera body; 3a denotes a mount pawl portion; 3b denotes a cutout portion into which a mount pawl portion of a lens side bayonet mount member inserts. A pawl portion of a one end side (the side of the rotation end of the case when the lens is attached by rotation) of a pawl portion of a mount pawl portion $3a_1$ of a part of the above-described camera side bayonet mount member has an abutment portion $3a_2$ on which a surface indicated in $16a_1$ of the lens side bayonet mount member 16 abuts in the rotation end position when in coupling, as shown in FIGS. 4 and 5. That is the width L of the abutment portion $3a_2$ is constructed to be wider than the width, l, of the mount pawl portion $3a_1$.

$3c$ denotes an engagement hole which a lock pin for lens lock formed on the aforesaid mount pawl portion $3a_1$ engages in. One side surface $3c_1$ of the aforesaid engagement hole 3c is made an inclined surface having an angle of inclination as shown in FIGS. 4 and 5.

16 denotes a lens side bayonet mount member having a mount pawl portion 16a and a cutout portion 16b which the mount pawl portion 3a of the camera side bayonet mount member 3 engages.

P represents the above-described lens lock pin held by the aforesaid bayonet mount member 16 and urged to one direction by a spring member 10. The lens lock pin P and the spring member 10 are contained in an accommodation hole of the lens side bayonet mount member 16 and are arranged so that the lock pin P is retracted into the accommodation hole against the spring force of the spring member 10 by operating an operating button (not shown) in operative connection with the lens lock pin P.

To attach the interchangeable lens to the camera body, the mount pawl portion 16a of the lens side bayonet mount member 16 is inserted into the cutout portion 3b of the camera side bayonet mount member 3 and the lens is turned in a direction to couple. The engagement due to the wedging effect of both the lens side and camera side bayonet mount members 16 and 3 results in a tightening and coupling Further as shown in FIG. 4, the surface indicated in $16a_1$ of the mount paw 16a of the lens side bayonet mount member 16 abuts on the aforesaid abutment portion $3a_2$ the camera side bayonet mount member 3, thereby the rotation is hindered. Thus, the bayonet coupling of the lens and the camera body is completed.

The shape of the lock pin P is made like a rectangular parallelepiped or a round rod or an angled rod, and its front end is made a flat surface. Further, the pawl width of the mount pawl portion $3a_1$ is made to become gradually larger from the size of the first portion of the pawl to the size of the final portion of the pawl.

Figure 6:
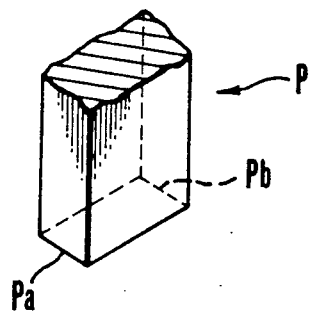
FIG. 6 is a fragmentary perspective view of the lock pin.

By this structure, in view of the fact that when the interchangeable lens is turned in the coupling operation, the front end of the aforesaid lock pin P slides on the edge surface $3a_3$ of the mount pawl portion $3a_1$ of the camera side bayonet mount member 3, with the result, shown in FIG. 5, that the front edge Pa (see FIG. 6) of the lock pin P as viewed from the coupling direction of rotation slides on the aforesaid edge surface $3a_3$, but the opposite edge Pb does not contact that surface. In the coupling end position, or the position at which the mount pawl portion 16a of the lens side bayonet mount member 16 abuts on the abutment portion $3a_2$ of the mount pawl $3a_1$, the lock pin P drops in the engagement hole 3c. However, the edge Pb of the lock pin P rests on the slant surface $3c_1$ of the engagement hole 3c. In other words, in a state where the contacting portion $3a_2$ of the mount pawl portion 16a of the lens side mount member 16 contacts with the abutment portion $3a_2$ of the mount pawl member 3a of the camera side mount member 3, the lock pin P does not strike the abutment portion $3a_2$ of the mount pawl portion $3a_1$ of the camera side bayonet mount member 3. Therefore, the lock pin P is not worn out and changed in shape by shocks, thereby giving an advantage of maintaining the high accuracy of adjustment of the locked position against aging.

To detach the interchangeable lens from the camera body, as described in connection with FIG. 2, a lock release button is operated, thereby the lock pin P is moved against the bias force of the spring 10 away from the engagement hole 3c to an engagement released position. Then, the interchangeable lens is turned in the direction to decouple until the bayonets of the camera body and lens disengage from each other.

During the decoupling of the bayonets of the camera body and lens, the lock pin P slides on the edge surface $3a_3$ of the mount pawl portion $3a_1$ of the camera side bayonet mount member 3, but that edge Pb which is to engage with the inclined surface $3c_1$ of the engagement hole 3c does not slide, the only sliding edge being Pa.

As has been described above, according to the present invention, in the coupling device provided with a camera side bayonet mount, an accessory side bayonet mount, a pin P for locking in either one of the camera and the accessory and an engagement hole 3c which the pin P for locking engages in the other, the position of the engaging portion Pb of the pin for locking which is to engage with the engagement hole when attaching the accessory is made different from the position of the sliding portion Pa of the aforesaid pin for locking which slidingly contacts with either one of the bayonets when detaching the accessory. This produces an advantage in that the accessory is prevented from being worn out by the sliding contact as the attaching-detaching operation is repeated so that the backlash of the locking member in the locking position and the deviation of the locking position due to the change of its shape can be diminished to allow for an accurate lens locking to be carried out.

What is claimed is:

1. A system for connecting a first functional body with a second functional body which is releasably attachable to said first functional body, comprising:
   (1) said first functional body including:
      (a) a mount portion to be connected with said second functional body; and
      (b) a lock member supported movably relative to said first functional body for locking said second functional body; and
   (2) said second functional body including:
      (a) a mount portion to be connected with said first functional body, said mount portion having a mount pawl for mounting;
      (b) an engaging portion formed on said mount pawl to engage with said lock member; and
      (c) detecting means for detecting that said lock member is engaged with said engaging portion, said detecting means issuing an output by which the connection between said first functional body and said second functional body is judged.

2. A system according to claim 1 further comprising:
   a first group of contacts arranged on said first functional body and connected to a first circuit in said first functional body;
   a second group of contacts arranged on said second functional body and connected to a power supply circuit; and
   power supply means arranged on said second functional body, said power supply means controlling said power supply circuit to supply power to at least one of said second group of contacts when said detecting means detects that said first functional body is connected to said second functional body.

3. A system according to claim 2, wherein said power supply means includes a second circuit which functions to restrict operation of the power supply.

4. A system according to claim 1, wherein said engaging portion is formed by a groove on said mount pawl.

5. A system according to claim 4, wherein said lock member is supported movably in a direction perpendicular to an optical axis and slidingly contacts with a peripheral surface of said mount pawl in response to mounting of both mount portions and then inserts into said groove.

6. A system according to claim 1, wherein said first functional body is an optical accessory and said second functional body is a camera body.

7. A system according to claim 6, wherein said optical accessory is an interchange lens.

8. A first functional body for connecting a second functional body which is releasably attachable to said first functional body, said second functional body having detecting means therewith, a mount portion and an engaging portion formed on a mount pawl of said mount portion, said first functional body comprising:
   a first functional body mount portion to be connected with said second functional body mount portion; and
   a movably supported lock member for locking said second functional body, said lock member actuating said detecting means when it engages with said engaging portion formed on a mount pawl of said second functional body mount position.

9. A first functional body according to claim 8, further comprising:
   a first group of contacts arranged on said first functional body and connected to a first circuit in said first functional body, said first group of contacts being supplied with power from a second group of contacts of said second functional body when said detecting means detects that said first functional body is connected to said second functional body.

10. A first functional body according to claim 9, wherein said first functional body is an optical accessory and said second functional body is a camera body.

11. A first functional body according to claim 10, wherein said optical accessory is an interchange lens.

12. A first functional body according to claim 8, wherein said lock member is supported movably in a direction perpendicular to an optical axis, slidingly contacts with a peripheral surface of said mount in response to mounting of both mount portions and then engages with said engaging portion.

13. A second functional body for connecting a first functional body which is releasably attachable to said second functional body, said first functional body having a mount portion and a lock member, said second functional body comprising:
   a second functional body mount portion to be connected with said first functional body mount portion, said second functional body mount portion having a mount pawl for mounting said first functional body mount portion;
   an engaging portion arranged on said mount pawl to engage with said lock member of said first functional body, detecting means on said second functional body for detecting that said lock member is engaged with said engaging portion, said detecting means issuing an output by which connection between said first functional body and said second functional body is judged.

14. A second functional body according to claim 13, further comprising:
   a second group of contacts arranged on said second functional body, connected to a power supply circuit and contactable with a first group of contacts of said first functionable body;
   power supply means arranged on said second functional body, said power supply controlling said power supply circuit to supply power to at least one of said second group of contacts when said detecting means detects that said first functional body is connected to said second functional body.

15. A second functional body according to claim 14 wherein said power supply means includes a circuit which functions to restrict supply of power by the power supply.

16. A second functional body according to claim 13, wherein said engaging portion is a groove formed on said mount pawl.

17. A second functional body according to claim 13, wherein said first functional body is an optical accessory and said second functional body is a camera body.

18. A system according to claim 17, further comprising a lock portion formed on said second mount pawl to contact with said first mount pawl and to position said first mount portion and said second mount portion at the completion of their mounting.

19. A system for connecting a first functional body with a second functional body which is releasably attachable to said first functional body, comprising:
   (1) said first functional body including:
      (a) a first mount portion to be connected with said second functional body, said first mount portion having a first mount pawl; and
      (b) a lock member supported movably relative to said first functional body, for locking said second functional body; and
   (2) said second functional body including:
      (a) a second mount portion to be connected with said first functional body, said second mount portion having a second mount pawl for mounting said first mount pawl; and
      (b) an engaging portion formed on said second mount pawl to engage with said lock member, slidingly contacting at a first portion with a peripheral surface of said second mount pawl, and when both said mount portions are connected and contacting at a second portion with said engaging portion when the connection of said both mount portions is completed, preventing said first functional body from moving in a counter-connection direction, said first portion and said second portion being arranged to be located at different sites.

20. A system according to claim 8, wherein said engaging portion contacting with said second portion is formed in a slant surface.

21. A system according to claim 18, wherein said lock portion has a thickness larger than other said portions.

22. A second functional body for connecting a first functional body which is releasably attachable to said second functional body, said first functional body having a mount portion, a mount pawl thereon and a lock member, said second functional body comprising:
   a second functional body mount portion to be connected with said first functional body mount portion, said second functional body mount portion having a second functional body mount pawl for mounting a said mount pawl of said first functional body mount portion;
   an engaging portion to engage with said lock member of said first functional body, said engaging portion being formed on said second functional body mount pawl; and said second functional body mount portion being arranged in such a manner that when both said mount portions are connected a first portion of said lock member slidingly contacts with a peripheral surface of said second functional body mount pawl, and when the connection is completed a second portion of said lock member, located at a different site from said first portion, contacts said engaging portion to prevent said first functional body from moving in a counter-connection direction.

23. A second functional body according to claim 22, wherein said engaging portion which contacts with said second portion is formed in a slant surface.

24. A second functional body according to claim 22 further comprising a lock portion formed on said second mount pawl to contact with said first mount pawl and to position said first mount portion and said second mount portion at the completion of their mounting.

25. A second functional body according to claim 24, wherein said lock portion has a thickness larger than said other portions.

* * * * *

UNITED STATES PATENT AND TRADEMARK OFFICE
CERTIFICATE OF CORRECTION

PATENT NO. : 5,012,264
DATED : April 30, 1991
INVENTOR(S) : Masatoshi Nagano and Kenichi Kawamoto It is certified that error appears in the above-identified patent and that said Letters Patent is hereby corrected as shown below: Title page:

Item [57], line 3. Delete "an"
    Col. 1, line 38. Change "to" to -- into --
    Col. 4, line 41. Change "compressing" to -- compression --
    Col. 5, line 21. Change "$T_2$" to -- $T_1$ --
    Col. 6, line 34. Delete "are provided"
    Col. 6, line 35. After "device", insert -- are provided --
    Col. 6, line 63. After "is" first occurrence, insert -- , --
    Col. 7, line 32. Change parallelepied" to -- parallel pipe --
    Col. 7, line 56. Change "3a" to -- $3_{a1}$ --
    Col. 10, line 51. Change "8" to -- 19 --

Signed and Sealed this

Twenty-seventh Day of October, 1992

Attest:

DOUGLAS B. COMER

Attesting Officer    Acting Commissioner of Patents and Trademarks